(12) United States Patent
Nehrhoff von Holderberg et al.

(10) Patent No.: US 12,492,801 B2
(45) Date of Patent: Dec. 9, 2025

(54) LUMINOUS FILM FOR RADIATING LIGHT IN A DIRECTED MANNER

(71) Applicant: LightnTec GmbH, Karlsruhe (DE)

(72) Inventors: Lutz Nehrhoff von Holderberg, Karlsruhe (DE); Florian Kall, Karlsruhe (DE)

(73) Assignee: LightnTec GmbH, Karlsruhe (DE)

( * ) Notice: Subject to any disclaimer, the term of this patent is extended or adjusted under 35 U.S.C. 154(b) by 0 days.

(21) Appl. No.: 18/808,344

(22) Filed: Aug. 19, 2024

(65) Prior Publication Data
US 2024/0410546 A1   Dec. 12, 2024

Related U.S. Application Data

(63) Continuation of application No. PCT/EP2022/054251, filed on Feb. 21, 2022.

(51) Int. Cl.
| | |
|---|---|
| *F21V 5/00* | (2018.01) |
| *F21S 4/22* | (2016.01) |
| *F21V 7/00* | (2006.01) |
| *F21V 8/00* | (2006.01) |
| *F21Y 115/10* | (2016.01) |

(52) U.S. Cl.
CPC ............... *F21V 5/005* (2013.01); *F21S 4/22* (2016.01); *F21V 7/0008* (2013.01); *G02B 6/0018* (2013.01); *F21Y 2115/10* (2016.08)

(58) Field of Classification Search
CPC .......... F21V 5/005; F21V 7/0008; F21S 4/22; G02B 6/0018
See application file for complete search history.

(56) References Cited

U.S. PATENT DOCUMENTS

| | | | |
|---|---|---|---|
| 5,241,457 A | 8/1993 | Sasajima et al. | |
| 9,688,186 B2 * | 6/2017 | Dellock | H05B 47/105 |
| 11,598,506 B2 | 3/2023 | von Holderberg et al. | |
| 2005/0265029 A1 * | 12/2005 | Epstein | G09F 9/33 |
| | | | 362/241 |

(Continued)

FOREIGN PATENT DOCUMENTS

| | | |
|---|---|---|
| GB | 2464102 A | 4/2010 |
| WO | 2004/068182 A2 | 8/2004 |

(Continued)

*Primary Examiner* — Abdulmajeed Aziz
*Assistant Examiner* — Nathaniel J Lee
(74) *Attorney, Agent, or Firm* — Orbit IP, LLP; Marc G. Martino

(57) ABSTRACT

A luminous film includes a plurality of light-emitting diodes. The luminous film has micro-optical elements which are arranged in at least one layer. A dedicated micro-optical region with corresponding micro-optical elements can be provided for each light-emitting diode, and the micro-optical elements can have different optical properties within the corresponding region depending on their position. The micro-optical regions can be designed to be structurally identical but differ in terms of optical properties depending on their location on the luminous film. Light emitted by the light-emitting diodes is deflected by the micro-optical elements such that for each light-emitting diode the main emission direction deviates from a surface normal of the luminous film in the region of the corresponding light-emitting diode.

20 Claims, 8 Drawing Sheets

(56) References Cited

U.S. PATENT DOCUMENTS

| | | | |
|---|---|---|---|
| 2011/0038151 A1* | 2/2011 | Carraher | F21S 8/08 |
| | | | 362/242 |
| 2015/0176808 A1* | 6/2015 | Takayama | F21V 13/04 |
| | | | 362/299 |
| 2022/0154911 A1* | 5/2022 | von Holderberg | F21S 4/22 |

FOREIGN PATENT DOCUMENTS

| | | | | |
|---|---|---|---|---|
| WO | 2015/058983 A1 | 4/2015 | | |
| WO | WO-2021023743 A1 * | 2/2021 | | F21S 4/20 |

* cited by examiner

LUMINOUS FILM FOR RADIATING LIGHT IN A DIRECTED MANNER

CROSS-REFERENCE TO RELATED APPLICATIONS

This continuation application claims priority to PCT/EP2022/054251 filed on Feb. 21, 2022 which has published as WO 2023/156015 A1, the entire contents of which are fully incorporated herein with these references.

DESCRIPTION

Field of the Invention

The invention relates to a luminous film having a plurality of light-emitting diodes arranged on a carrier layer and having at least one first micro-optical layer for deflecting the light emitted by the light-emitting diodes.

Background of the Inventions

Such a luminous film is known from WO 2021/023743 A1. Such luminous films are used, for example, indoors.

The luminous film known from WO 2021/023743 A1 has a plurality of light-emitting diodes, a carrier layer, and a light-conducting layer made of micro-optical structures, which allow redirecting of light emitted multidirectionally by the light-emitting diodes into a common emission direction of the luminous film. This makes it possible to achieve uniform illumination of the surface of the luminous film with a small number of light-emitting diodes in the luminous film. The emission direction can be orthogonal to the luminous film.

In particular, when luminous films are used in outdoor regions, viewers look at the luminous film from different directions. For example, when used on buildings, the observation is often done from below. Light emitted horizontally or upward is therefore wasted.

SUMMARY OF THE INVENTION

Object of the Invention

It is the object of the invention to improve the energy efficiency of luminous films.

DESCRIPTION OF THE INVENTION

This object is achieved according to the invention by a luminous film with the features specified in the first independent claim, a luminous arrangement according to another claim, and an operating method according to another claim.

Luminous film according to the invention:

According to the invention, a luminous film is provided. The luminous film comprises a plurality of light-emitting diodes. Typically, the number of light-emitting diodes is at least 1,000, preferably at least 10,000, particularly preferably at least 100,000. The light-emitting diodes are arranged on a carrier layer, in particular, attached directly to the carrier layer. For example, the light-emitting diodes can be glued or welded to the carrier layer. The carrier layer can be a film, in particular, a black one, for example made of plastics material or textile fabric. The carrier layer can give the luminous film stability and protect the light-emitting diodes from damage. The light-emitting diodes are typically electrically connected to one another by a conductor layer. The conductor layer can be provided on or in the carrier layer.

The luminous film further comprises at least one first micro-optical layer for deflecting the light emitted by the light-emitting diodes. According to the invention, a main emission direction of the luminous film for the light-emitting diodes deviates from a surface normal of the luminous film in the region of the corresponding light-emitting diode. In other words, the micro-optical layer causes the main emission direction to deviate from the surface normal when the luminous film is in operation (i.e., when the light-emitting diodes are switched on). The light is emitted in a directed manner. This allows the light emitted by the luminous film to be directed specifically to the position of a viewer or to a surface to be illuminated. The proportion of emitted light that does not reach the intended target is reduced. On the one hand, the luminous film according to the invention reduces the energy requirement which is necessary to achieve a desired illuminance in the region to be illuminated. At the same time, the emission of light in undesirable directions is reduced, thus also reducing light pollution.

The main emission direction describes the direction in which the light emitted by one of the light-emitting diodes reaches its maximum intensity. The deviation of the main emission direction from the corresponding surface normal is preferably at least 15°, particularly preferably at least 30°, most particularly preferably at least 45°. The surface normal runs perpendicular to the light-emitting surface of the luminous film and generally through the corresponding light-emitting diode. In the case of a flatly arranged luminous film, the surface normal has the same direction for all light-emitting diodes. In the case of a luminous film arranged in a curved manner, the surface normals for different light-emitting diodes point in different directions.

Generally, the main emission direction of all light-emitting diodes on the luminous film deviates from the corresponding surface normal. In special cases, the luminous film can have additional light-emitting diodes in which the main emission direction corresponds to the corresponding surface normal. The number of additional light-emitting diodes is generally less than 5%, preferably less than 2%, particularly preferably less than 1%, of the number of light-emitting diodes.

It is preferably provided that for the light-emitting diodes, in particular, all light-emitting diodes except for some additional light-emitting diodes that may be present, a range of light emission is in each case at most 120°, preferably at most 90°, particularly preferably at most 60°, very particularly preferably at most 45°. This further reduces light pollution when the luminous film is in operation.

In a preferred embodiment, the first micro-optical layer has a first micro-optical region with first micro-optical elements for each light-emitting diode. The micro-optical regions for the individual light-emitting diodes can be spaced apart from one another or directly adjacent to each other. By providing a dedicated micro-optical region for each light-emitting diode, the structure of the luminous film is simplified. In addition, the emission properties of the luminous film can be controlled particularly advantageously by adapting the optical properties to a position of the corresponding light-emitting diode on the luminous film.

Preferably, at least one optical property of the first micro-optical elements changes across the corresponding first micro-optical region. The optical property can change continuously or steadily in a direction passing through the corresponding first micro-optical region. This takes into account the fact that, depending on the position of the micro-optical element relative to the associated light-emitting diode, a deflection of the light emitted multidirectionally by the corresponding light-emitting diode to varying degrees is required in order to achieve the desired emission properties of the luminous film.

Particularly preferably, the first micro-optical elements each have a reflection layer, in particular, wherein the reflection layers of the corresponding first micro-optical region form different angles with a light input side of the first micro-optical layer in the corresponding first micro-optical region. Light from the light-emitting diodes hitting the reflection layers is thus reflected in the desired direction. In a direction crossing the corresponding first micro-optical region, the angles of successive micro-optical elements can continuously increase. The light input side typically runs parallel to a tangential plane to the luminous film in the region of the corresponding micro-optical element. In other words, the surface normal is typically perpendicular to the light input side.

The first micro-optical elements can each have a prism, in particular, with a triangular cross-sectional area. In this way, the light emitted by the light-emitting diodes can be assisted in deflecting in the desired direction. In addition, such micro-optical elements can be manufactured cost-effectively.

Particularly preferably, the reflection layers are formed on a lateral surface of the corresponding prism. This further improves the effectiveness of the first micro-optical layer. In addition, the first micro-optical layer can be efficiently produced, for example, by vapor-depositing the reflection layer onto the corresponding lateral surfaces.

The first micro-optical layer can be formed with an embossed plastics film, in particular, made of acrylic plastics material. In particular, prismatic micro-optical elements can be embossed into the film. This further simplifies the production of the first micro-optical layer. The refractive index of the plastics film is typically greater than 1. Alternatively or additionally, microlenses could be glued onto a plastics film.

The first micro-optical elements can run parallel to one another in the corresponding first micro-optical regions. In other words, the micro-optical elements can be arranged in a lamellar manner. In this way, it can be achieved that the first micro-optical layer causes a deflection of the light emitted by the light-emitting diodes in a first plane which runs perpendicular to the extension direction of the micro-optical regions. This is advantageous for the manufacturability and layout of the luminous film.

In an advantageous embodiment, it is provided that the luminous film has a second micro-optical layer for deflecting the light emitted (during operation) by the light-emitting diodes, wherein the second micro-optical layer causes a deflection in a different direction than the first micro-optical layer. This allows the emission properties of the luminous film to be adapted to complex operating conditions, in particular, when the luminous film is arranged in a curved manner in a plurality of directions. The second micro-optical layer can basically be constructed like the first micro-optical layer; in this respect, reference is made to the previous description.

In particular, the second micro-optical layer can have a second micro-optical region with second micro-optical elements for each light-emitting diode, preferably wherein at least one optical property of the second micro-optical elements changes across the corresponding second micro-optical region, in particular, continuously. The second micro-optical elements are generally oriented to deflect the light in a different plane than the first micro-optical elements.

Preferably, the second micro-optical layer is arranged between the light-emitting diodes and the first micro-optical layer. The second micro-optical regions of the second micro-optical layer can then be smaller than the first micro-optical regions of the first micro-optical layer. It can be provided that the second micro-optical regions are spaced apart from one another, while the first micro-optical regions are directly adjacent to one another.

The second micro-optical elements can each have a reflection layer. Preferably, the second micro-optical elements each have a prism, in particular, with a triangular cross-sectional area, particularly preferably wherein the reflection layers are formed on a lateral surface of the corresponding prism. The second micro-optical layer can be formed with an embossed plastics film, in particular, made of acrylic plastics material. In particular, prismatic micro-optical elements can be embossed into the film. The refractive index of the plastics film is typically greater than 1.

The second micro-optical elements can run parallel to one another in the corresponding second micro-optical regions. In other words, the second micro-optical elements can be arranged in a lamellar manner. Typically, the second micro-optical elements extend perpendicular to the first micro-optical elements, in case these also run parallel to one another.

The first and/or second micro-optical regions can be individually adapted for the individual light-emitting diodes or groups of light-emitting diodes. In other words, the micro-optical regions in different portions of the luminous film can differ from one another.

In a preferred embodiment, the luminous film has a diffuser layer. The light emitted by the light-emitting diodes can thus be homogenized. The number of light-emitting diodes required for uniform lighting can be reduced. The diffuser layer is typically arranged between the light-emitting diodes and the first or second micro-optical layer.

Preferably, a separate diffuser element is provided for each light-emitting diode. This simplifies the structure of the diffuser layer or the luminous film as a whole. The diffuser elements can have a diameter that is smaller than a distance between adjacent light-emitting diodes, in particular, smaller than two thirds of the distance between adjacent light-emitting diodes.

The distance between adjacent light-emitting diodes can be at least 1 mm, preferably at least 2 mm, particularly preferably at least 5 mm, and/or at most 100 mm, preferably at most 60 mm, particularly preferably at most 40 mm. A diameter of the diffuser elements can be at least 0.5 mm, preferably at least 1 mm, particularly preferably at least 2.5 mm, and/or at most 50 mm, preferably at most 30 mm, particularly preferably at most 20 mm. In particular, the diameter of the diffuser elements can correspond to half the distance between the light-emitting diodes.

The layers (i.e., at least the carrier layer and the first micro-optical layer and optionally the second micro-optical layer, the diffuser layer and/or the conductor layer) of the luminous film can be connected to one another by an optically transparent adhesive. This allows for efficient production of the luminous film. At the same time, the brightness of the luminous film is not noticeably affected by the transparency of the adhesive.

The individual light-emitting diodes of the luminous film can usually be controlled independently of one another. The luminous film can therefore be used for a wide variety of applications and can, for example, display images, symbols or videos. The luminous film can have a control device for activating the individual light-emitting diodes independently of one another. The control device can be attached to the carrier layer, for example as an integrated circuit. The control device can be connected to the light-emitting diodes via control lines, in particular, via a conductor layer.

An embodiment is preferred in which a thickness of the luminous film is at least 0.1 mm, preferably at least 0.2 mm, particularly preferably at least 0.3 mm, and/or at most 40 mm, preferably at most 30 mm, particularly preferably at most 20 mm. The thickness of the luminous film is always measured in the direction of the surface normal.

An embodiment is particularly preferred in which the film is designed to be bendable, in particular, rollable. In particular, the bending radius and/or rolling radius is at least 1 cm, preferably at least 2 cm, and/or at most 10 cm, preferably at most 5 cm.

The term "light-emitting diode" is used here to represent all light-emitting diodes, diode modules, diode components (dies), etc. A person skilled in the art is aware that the use of more specific light-emitting diode modules can lead to modifications of the luminous film according to the invention. The term "light-emitting diode" also refers to all colors of light-emitting diodes and combined colors in light-emitting diode dies.

Luminous Arrangement According to the Invention:

The scope of the present invention also includes a luminous arrangement with a holding structure and a luminous film according to the invention as described above, which is held on the holding structure. The holding structure allows the luminous film to be brought into an operating position and fixed in this operating position. The previously described advantageous effects of the luminous film according to the invention become particularly apparent.

The holding structure can be part of a motor vehicle, in particular, a body of the motor vehicle. The invention therefore also relates to the use of a luminous film according to the invention as described above on a motor vehicle, and to a motor vehicle having a luminous film according to the invention as described above. In particular, the luminous film can be attached to the outside of the motor vehicle. The directional properties of the luminous film make it possible, for example, to optically highlight planned driving maneuvers such as parking maneuvers on a roadway. Optical communication with pedestrians detected by a driver assistance system can also take place, for example by projecting light signals into the pedestrian's expected path.

The holding structure can be part of a building. The invention therefore also relates to the use of a luminous film according to the invention as described above on a building, and to a building with a luminous film according to the invention as described above. In particular, the luminous film can be attached to a facade of a building. In this application, the advantages of the luminous film in terms of reduced energy requirement and reduction of light pollution are particularly evident.

Preferably, the main emission direction of the luminous film for the light-emitting diodes is directed downward. This makes it possible to direct the emitted light specifically at a region in front of a building or a motor vehicle.

A region of light emission can extend up to at most 10° above the horizontal, preferably up to at most the horizontal, particularly preferably up to at most 30° below the horizontal, most preferably up to at most 45° below the horizontal. In particular, when the luminous film is used on a building, light pollution can be effectively reduced and energy requirement can be significantly reduced. Compared to a conventional luminous film with an emission angle of almost 180°, the luminous intensity is doubled with emission up to at most the horizontal with the same energy input; conversely, the energy requirement can be halved for the same luminous intensity in the region to be illuminated. With emission up to at most 45° below the horizontal, the luminous intensity quadruples with the same energy input compared to a conventional luminous film with an emission angle of almost 180°; conversely, for the same luminous intensity in the region to be illuminated, the energy requirement can be reduced to a quarter.

The luminous film can be held on the holding structure curved in at least one direction, preferably curved in two directions. Due to the at least one curvature, the luminous film is formed three-dimensionally. In particular, a facade with the luminous film can run in a curved manner in one or more directions. Likewise, a body part of a motor vehicle with the luminous film can be curved in one or more directions. Concave and convex curvatures can alternate in one or two directions. The luminous film can, for example, be wave shaped. Typically, the micro-optical regions for the light-emitting diodes are individually adapted to their position on the curved luminous film or holding structure. This makes it possible to achieve uniform illumination despite the differently oriented surface normals.

In order to form the luminous film three-dimensionally, the luminous film can have cuts, and the portions separated from one another by cutting lines can be folded. Alternatively, it is conceivable to obtain a three-dimensional shape of the luminous film by thermoforming, in particular, vacuum thermoforming. If the holding structure is an injection-molded part, the luminous film can be inserted into an injection mold and be back-molded so that the luminous arrangement is created as a composite component with the holding structure and the luminous film.

Operating Method According to the Invention:

The scope of the present invention also includes an operating method for a luminous film according to the invention as described above or a luminous arrangement according to the invention as described above. The operating method provides that the light-emitting diodes in different portions of the luminous film are operated with different luminosity so that a uniform illuminance is achieved within an illuminated area. This operating method is particularly useful when the luminous film is curved and/or the surface to be illuminated is not flat. In particular, due to the curvature of the luminous film and possibly different emission angles of the luminous film for the individual light-emitting diodes, the light from different numbers of light-emitting diodes can overlap in different sectors of the illuminated area. If all light-emitting diodes had a uniform luminosity, this would result in inhomogeneous lighting with brightness peaks. The energy expenditure for excessive illumination of individual sectors of the illuminated area is avoided according to the invention.

Further features and advantages of the invention can be found in the description, the claims, and the drawings. According to the invention, the aforementioned features and those which are to be explained below can each be used individually or as a plurality in expedient combinations of any kind. The embodiments shown and described are not to be understood as an exhaustive list, but, rather, have an exemplary character for the description of the invention.

DETAILED DESCRIPTION OF THE INVENTION AND DRAWINGS

The invention is shown in the drawings and is described on the basis of embodiments. In the drawings.

Figure 9:
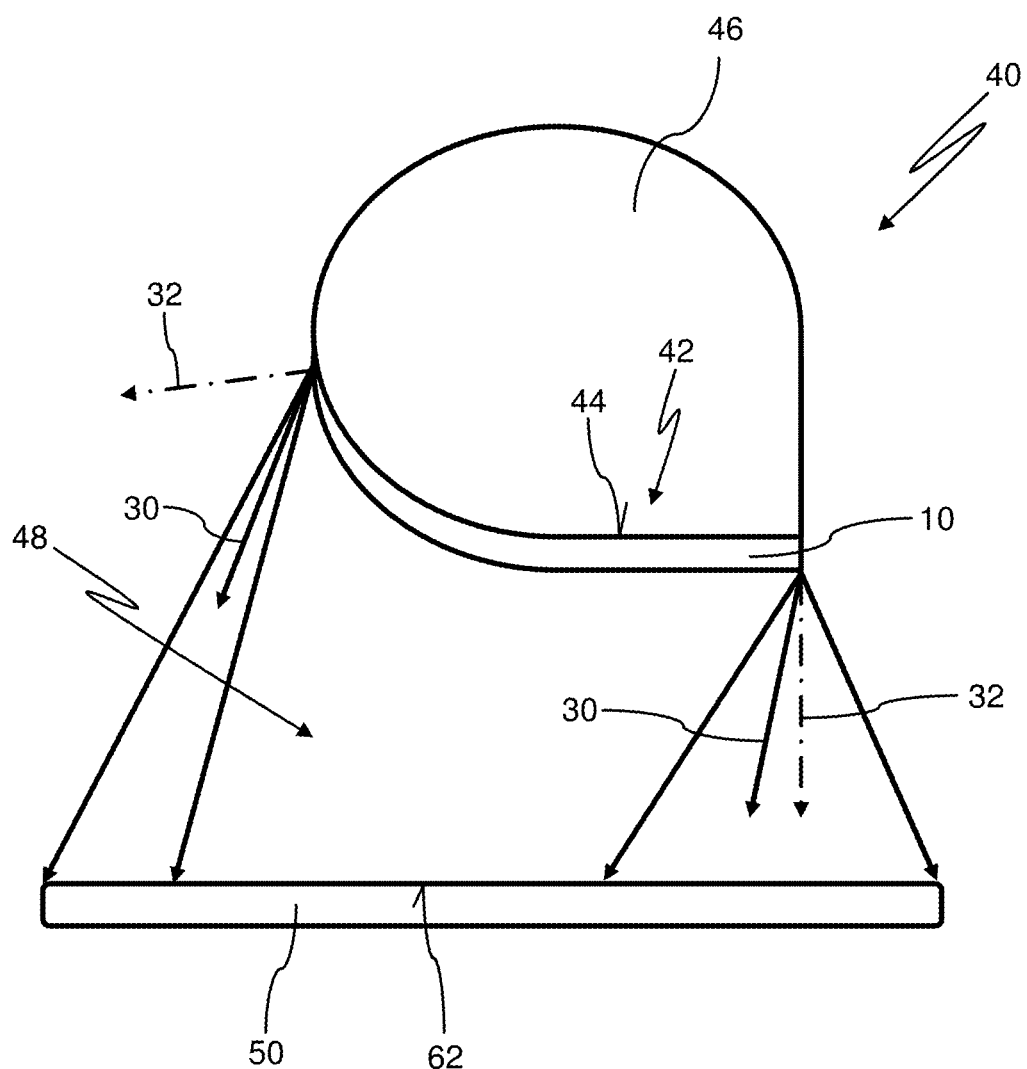
Figure 10:
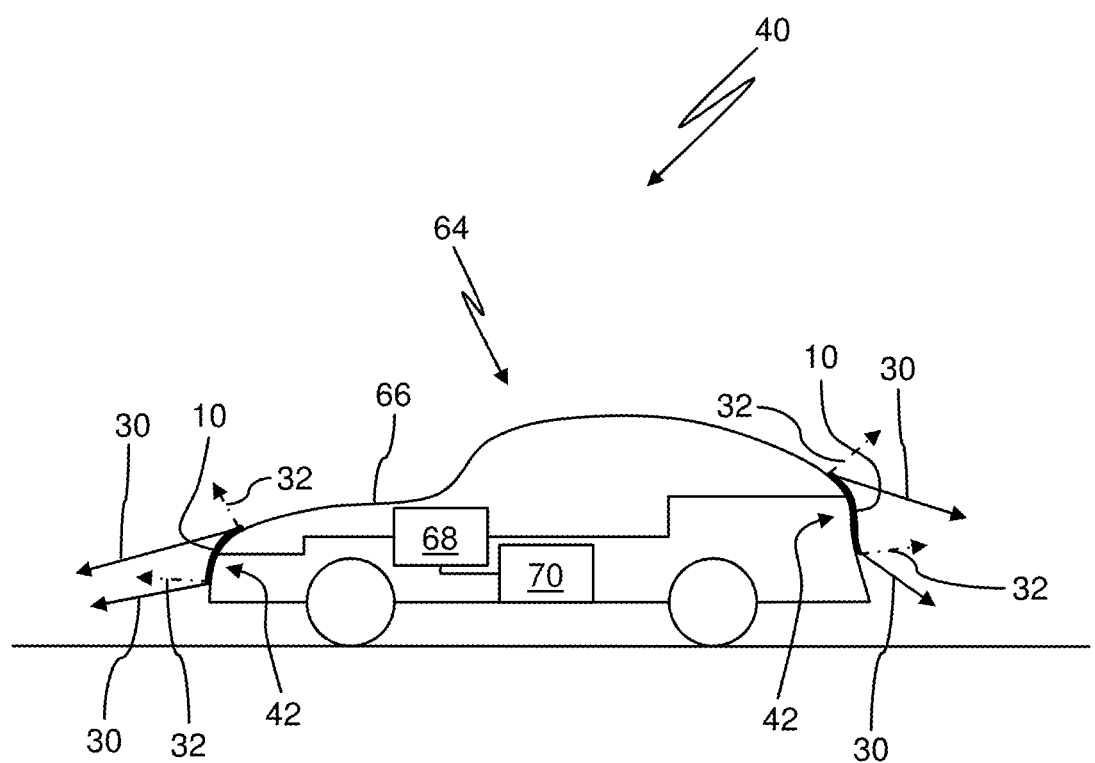

FIG. 9 is a schematic plan view of a luminous arrangement according to the invention, with a curved luminous film according to the invention, wherein light-emitting diodes in different regions of the luminous film shine with different brightness in order to evenly illuminate an illuminated area; and FIG. 10 is a schematic side view of a luminous arrangement according to the invention, with two curved luminous films according to the invention, which are held on a body of a motor vehicle.

DETAILED DESCRIPTION OF EMBODIMENTS OF THE INVENTION

Figure 1:
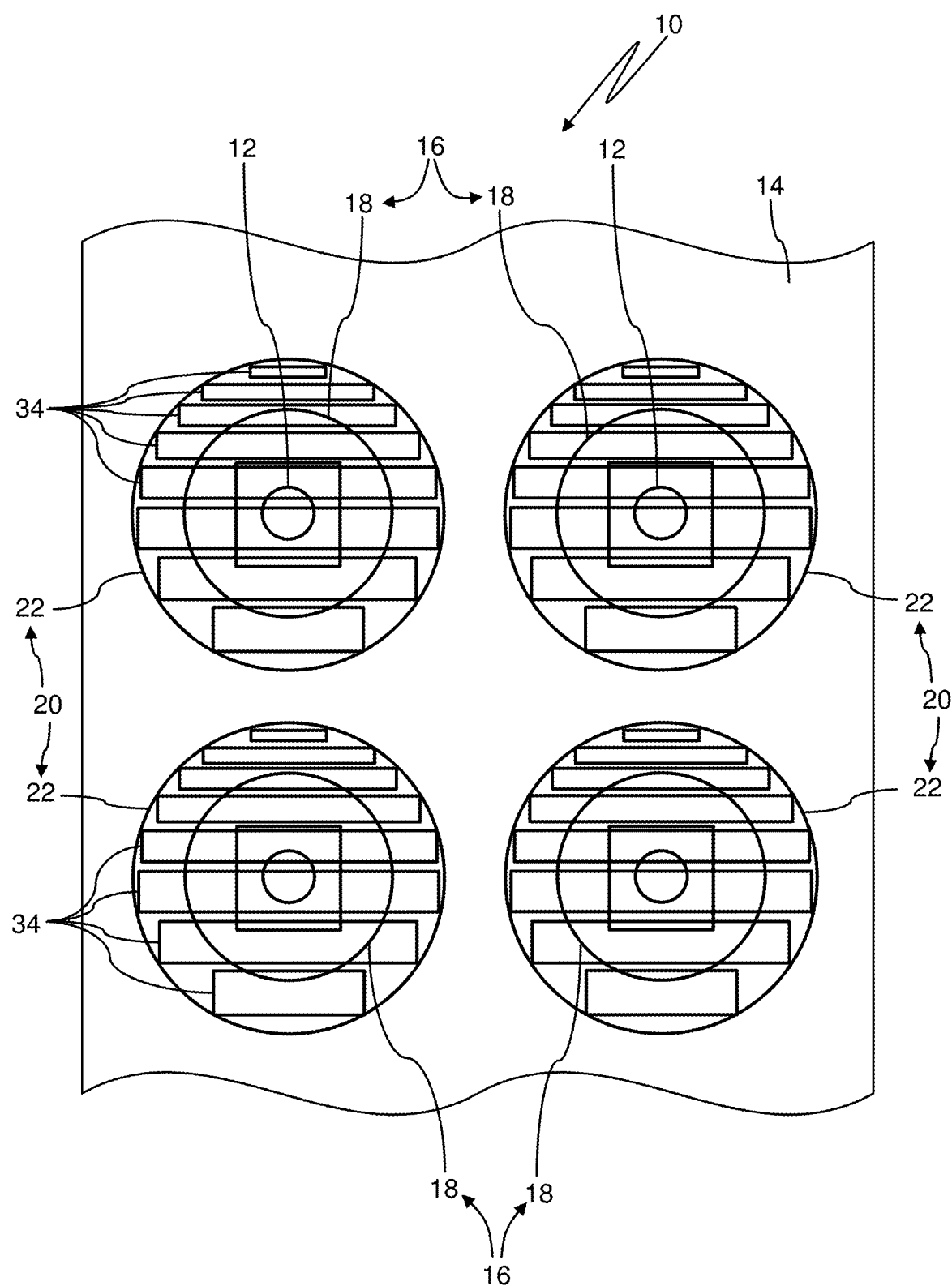
FIG. 1 is a schematic plan view of a detail of a luminous film according to the invention, with a plurality of light-emitting diodes for emitting light through a diffuser layer and a first micro-optical layer, wherein first micro-optical regions are spaced apart from one another.

FIG. 1 shows a luminous film 10 according to the invention in a partial representation. The luminous film 10 has a plurality of light-emitting diodes 12, four of which are located in the detail shown. The light-emitting diodes 12 are held on a carrier layer 14. The carrier layer 14 can be formed by a plastics tarpaulin. A conductor layer (not shown in detail) serves to supply power to the light-emitting diodes and can also be held on the carrier layer 14.

Light emitted by the light-emitting diodes 12 is guided through a diffuser layer 16 with individual diffuser elements 18 and a first micro-optical layer 20 with first micro-optical regions 22. Each individual light-emitting diode 12 is assigned a diffuser element 18 and a first micro-optical region 22. In the embodiment shown in FIG. 1, the first micro-optical regions 22 are spaced apart from one another.

The light-emitting diodes 12 are arranged in a matrix-like manner in rows and columns. A distance between adjacent light-emitting diodes 12 in the rows or columns can be, for example, 16 mm. The diameter of the diffuser elements can be, for example, 8 mm.

Figure 2:
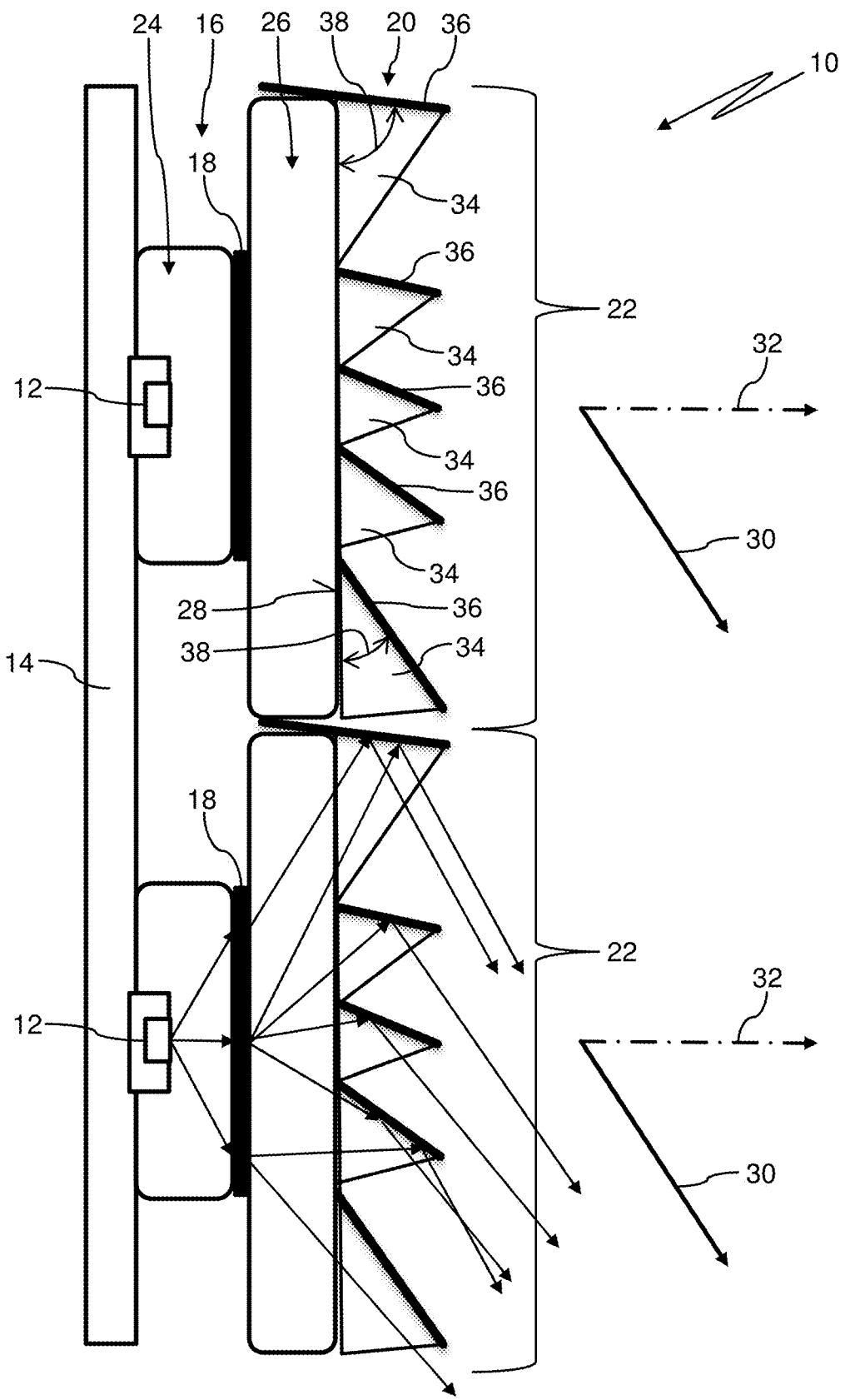
FIG. 2 is a schematic cross section through a luminous film according to the invention, with a plurality of light-emitting diodes for emitting light through a diffuser layer and a first micro-optical layer, wherein first micro-optical regions are directly adjacent to one another.

FIG. 2 shows a similar luminous film 10 as FIG. 1 in a sectional view. Deviating from FIG. 1, in the embodiment shown in FIG. 2 the first micro-optical regions 22 of adjacent light-emitting diodes 12 are directly adjacent to one another. Otherwise, the luminous films 10 shown in FIGS. 1 and 2 correspond in their structure.

The diffuser elements 18 are connected to the carrier layer 14 via a first adhesive layer 24 made of optically transparent adhesive, for example acrylic adhesive. The light-emitting diodes 12 are embedded here in the first adhesive layer 24. The light-emitting diodes 12 can also be glued to the carrier layer 14 in a manner not shown in detail.

The first micro-optical layer 20 is connected to the diffuser layer 16 or the diffuser elements 18 via a second adhesive layer 26 made of optically transparent adhesive, for example acrylic adhesive. It is understood that the first and second adhesive layers 24, 26 could also merge into one another and completely envelop the diffuser elements 18 (not shown in more detail).

The light emitted by the light-emitting diodes 12 passes through the first adhesive layer 24 and hits the diffuser elements 18; compare the beam paths shown as examples with arrows in the lower part of FIG. 2 (refraction effects are not shown in the beam paths for the sake of clarity). The diffuser elements 18 scatter the light emitted by the light-emitting diodes 12.

The scattered light passes through the second adhesive layer 26 and strikes the first micro-optical regions 22 of the first micro-optical layer 20 on a light input side 28. The first micro-optical layer causes a deflection of the light so that for each light-emitting diode 12 a main emission direction 30 deviates from a corresponding surface normal 32. Deflected light rays do not run strictly parallel to one another; rather, the maximum intensity of the light emitted by a first micro-optical region 22 is located in the main emission direction 30. In the embodiment shown, the first micro-optical layer 20 causes a deflection of the light by approximately 60° (by 60° downward in the orientation of the luminous film 10 shown in FIG. 2). The surface normals 32 are each aligned perpendicular to the light input side 28 of the first micro-optical regions 22 of the corresponding light-emitting diodes 12.

The first micro-optical layer 20 has a plurality of first micro-optical elements 34 in each first micro-optical region 22. The first micro-optical elements 34 are prismatic with a triangular cross-sectional area. In particular, the first micro-optical elements 34 extend parallel to one another within a corresponding first micro-optical region 22, see also FIG. 1. In the flat state of the luminous film 10, the first micro-optical elements 34 of different first micro-optical regions 22 also run parallel to one another.

The first micro-optical layer 20 is formed in the present case by a plastics film, for example made of acrylic plastics material. The prismatic first micro-optical elements 34 can be embossed into the plastics film.

The first micro-optical elements 34 each have a reflection layer 36. The reflection layers 36 are each formed on a lateral surface of the prismatic first micro-optical elements 34. For example, the reflection layers 36 can be vapor-deposited onto the corresponding lateral surfaces. In the boundary region between adjacent first micro-optical regions 22, it can be provided that the reflection layers 36 extend into the second adhesive layer 26 in order to prevent light from one light-emitting diode 12 from passing into the first micro-optical region 22 assigned to another light-emitting diode 12.

In order to cause a deflection of the light hitting the light input side 28 from different directions into the main emission direction 30 across the entire first micro-optical regions 22, an optical property of the first micro-optical elements 34 changes within the corresponding first micro-optical regions 22. Here, the individual reflection layers 36 each enclose a different angle 38 with the light input side 28. In the illustrated cross section perpendicular to the extension direction of the first micro-optical elements 34, the angle 38 changes continuously; in FIG. 2, the angle 38 increases from bottom to top.

Figure 3:
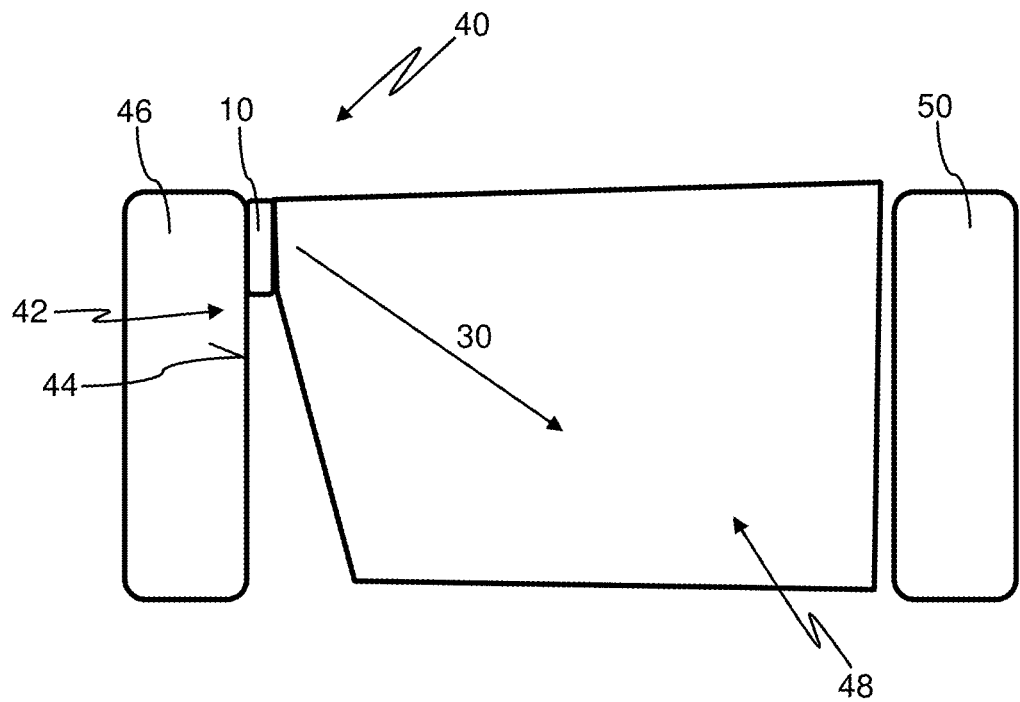
FIG. 3 is a schematic side view of a luminous arrangement according to the invention, with a luminous film according to the invention held on a building, the emission range of which extends from below to just above the horizontal.

FIG. 3 shows a luminous arrangement 40 with a luminous film 10, as shown for example in FIG. 1 or 2. The luminous film 10 is held on a holding structure 42. The holding structure 42 here is a facade 44 of a building 46.

By appropriately adjusting the optical properties of the first micro-optical layer 20, the luminous film 10 of the luminous arrangement 40 of FIG. 3 is designed such that light is emitted into a region 48 which extends almost perpendicular downward and extends upward to just above the horizontal. Beyond these limits, practically no light is emitted. The main emission direction 30 is directed downward and can be inclined relative to the horizontal by, for example, approximately 30°.

Since in the luminous arrangement 40 of FIG. 3 a proportion of the light is also emitted in an approximately horizontal direction, an opposite further building 50 is located in the emission range 48 of the luminous film 10.

Figure 4:
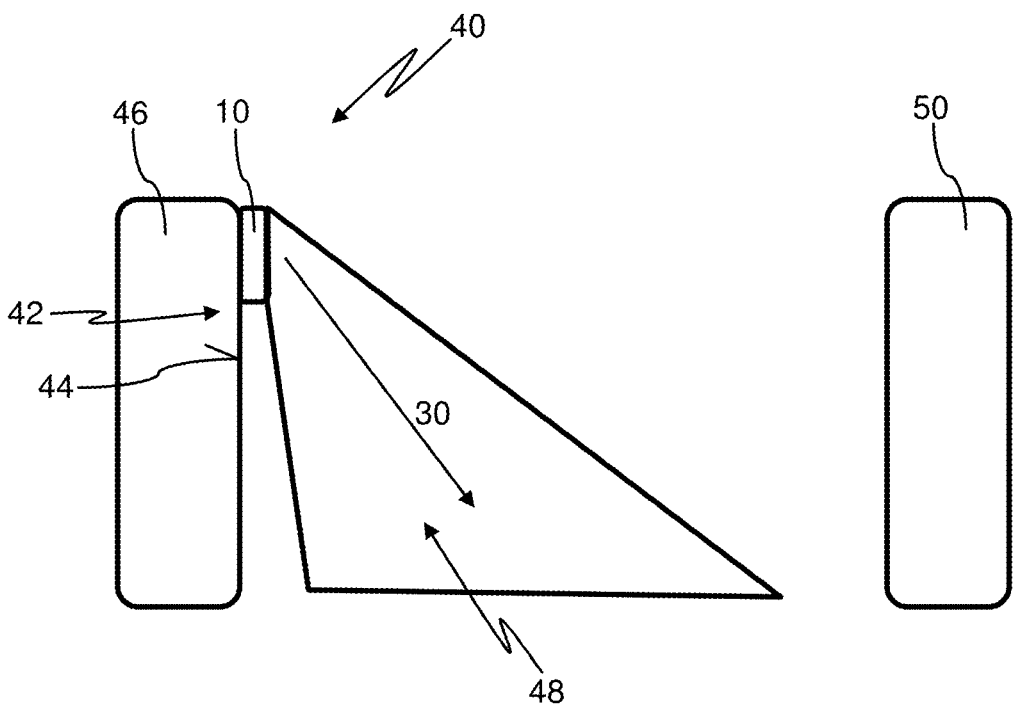
FIG. 4 is a schematic side view of a luminous arrangement according to the invention, with a luminous film according to the invention held on a building, the emission range of which extends from below to 45° below the horizontal.

FIG. 4 shows a similar luminous arrangement 40 as FIG. 3. Optical properties of the first micro-optical layer 20 of the luminous film 10 are selected here such that the emission range 48 extends from almost perpendicular downward to approximately 45° below the horizontal. In FIG. 4, the main emission direction 30 runs downward at an angle of approximately 60° to the horizontal. In this embodiment, the opposite building 50 is not located in the emission range 48 of the luminous film 10.

Figure 5:
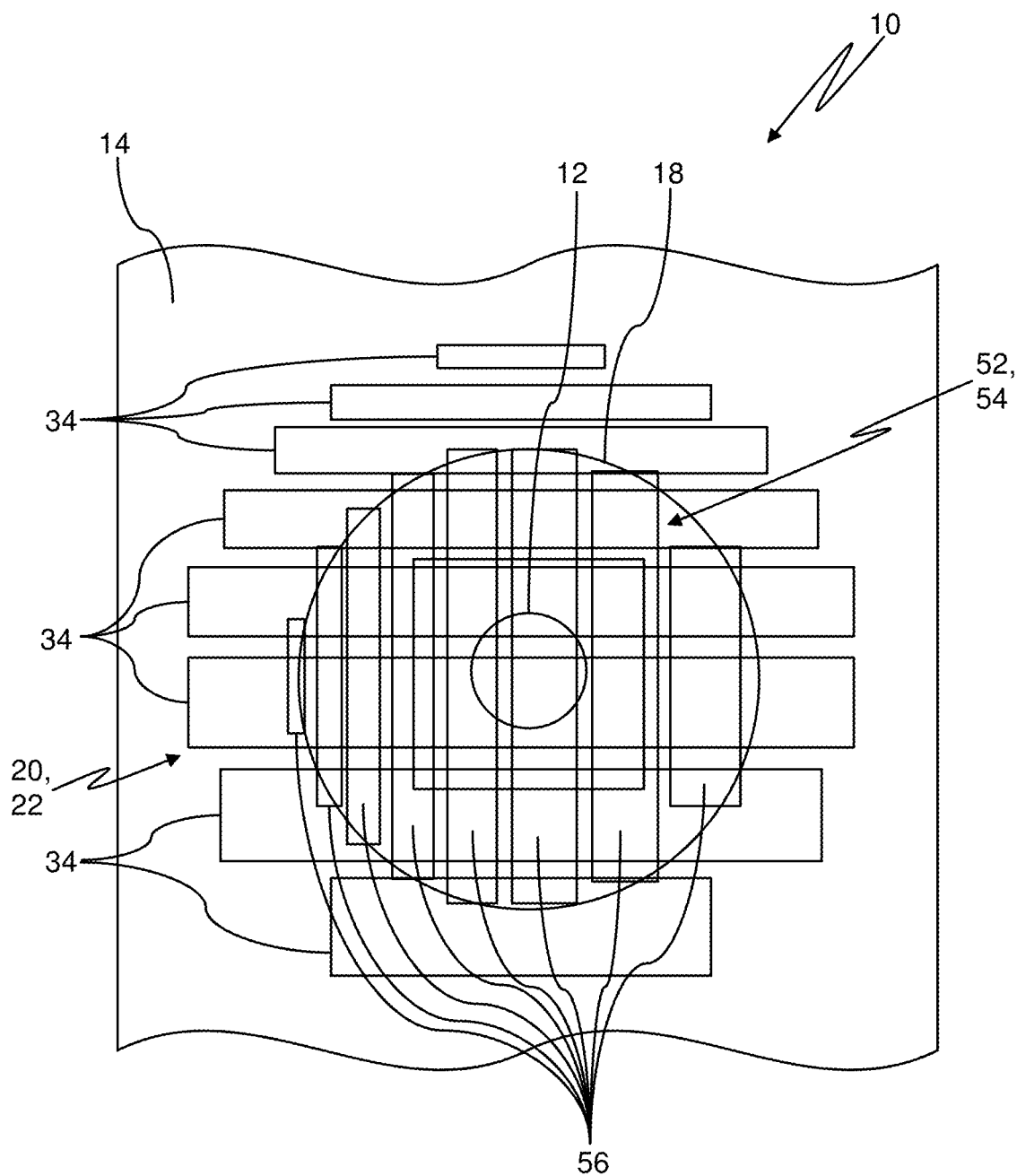
FIG. 5 is a schematic plan view of a detail of a luminous film according to the invention, with a plurality of light-emitting diodes, for emitting light through a diffuser layer and a first and a second micro-optical layer, wherein only one of the many light-emitting diodes is shown.
Figure 6:
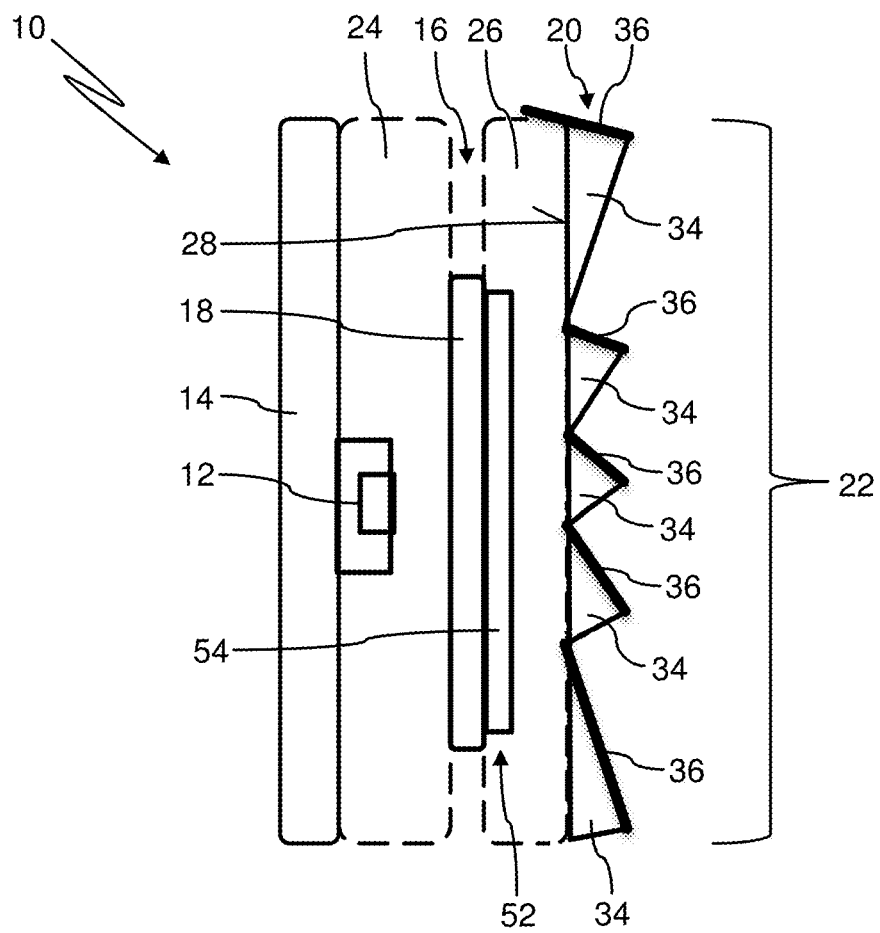
FIG. 6 is a schematic vertical section through the luminous film of FIG. 6.
Figure 7:
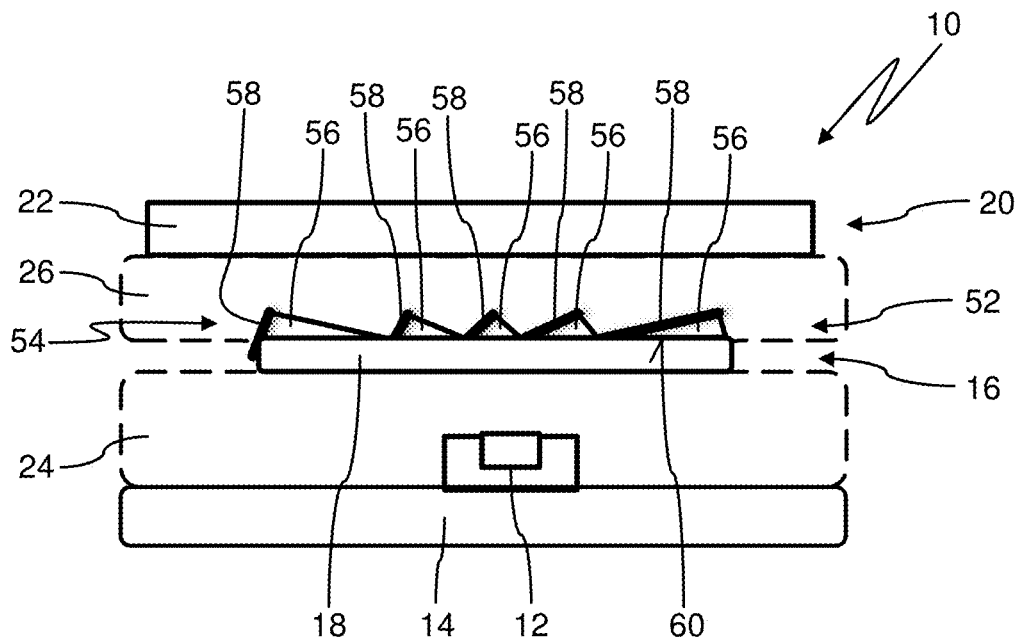
FIG. 7 is a schematic horizontal section through the luminous film of FIG. 6.
Figure 8:
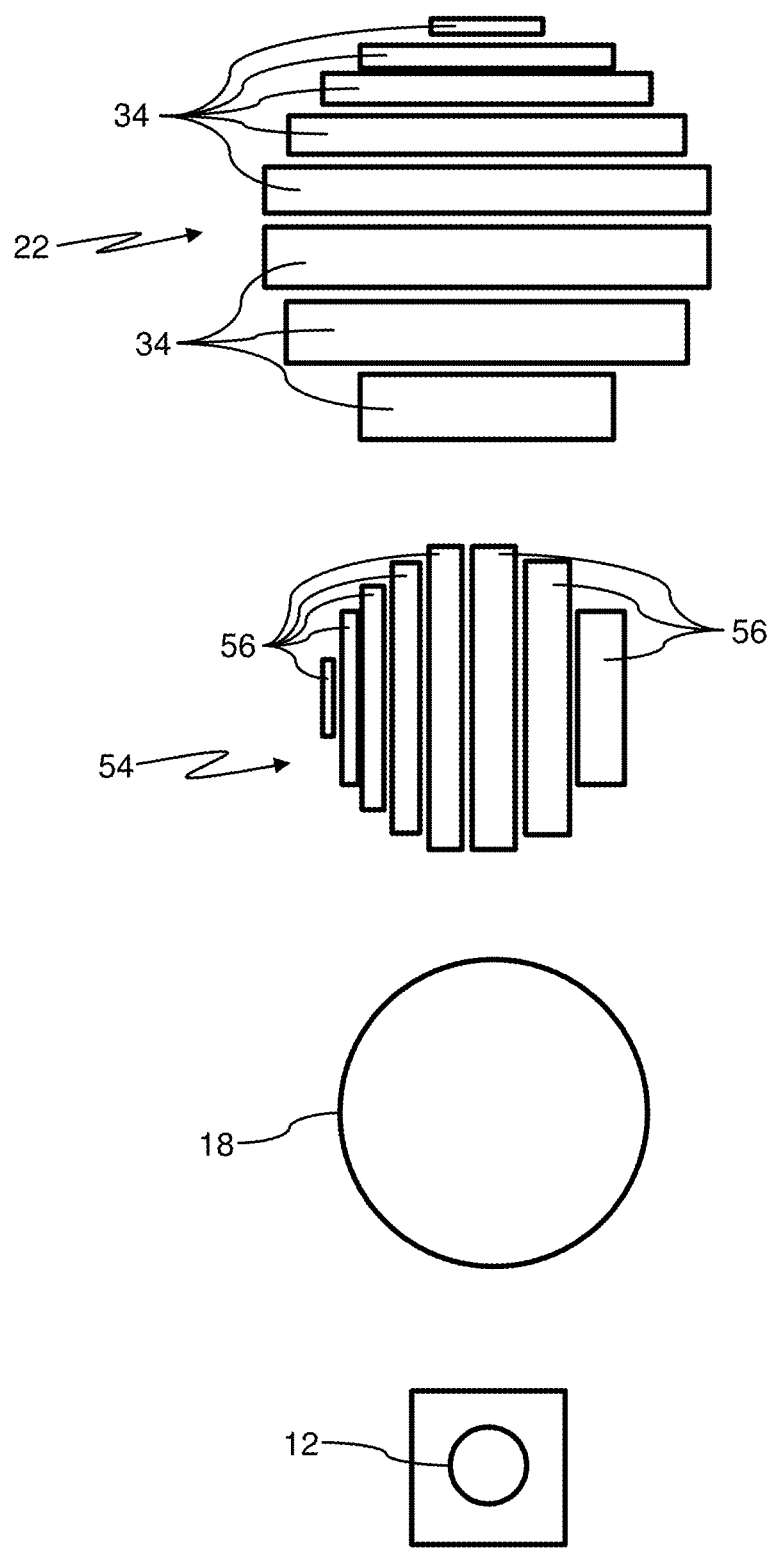
FIG. 8 is a schematic representation of individual parts of the luminous film of FIG. 6.

FIG. 5 is a detail of a luminous film 10 with multiple light-emitting diodes 12 held on a carrier layer 14, wherein a second micro-optical layer 52 is provided in addition to a diffuser layer 16 and a first micro-optical layer 20; see also FIGS. 6, 7, and 8. The second micro-optical layer 52 causes a deflection of the light emitted by the light-emitting diodes 12 in a different direction than the first micro-optical layer 20. Here, the first and second micro-optical layers 20, 52 act in mutually perpendicular directions. Accordingly, in second micro-optical regions 54, second micro-optical elements 56 are oriented perpendicular to first micro-optical elements 34 in first micro-optical regions 22.

In the present case, the second micro-optical layer 52 is constructed in the same way as the first micro-optical layer 20. In particular, the second micro-optical layer 52 can be formed by an (acrylic) plastics film into which the second micro-optical elements 56 are embossed as prisms with a triangular cross-sectional area. Lateral surfaces of the second micro-optical elements 56 are each provided with a reflection layer 58, see, in particular, FIG. 7. Between the reflection layers 58 and a light input side 60 of the second micro-optical layer 52, different angles are formed within a corresponding second micro-optical region 54.

The diffuser layer 16 with the diffuser elements 18 is here—as in the case of the luminous films 10 shown in FIG. 1 or 2—connected to the carrier layer 14 via a first adhesive layer 24 made of optically transparent adhesive. The second micro-optical layer 52 can be glued directly onto the diffuser layer 16 or the diffuser elements 18.

Alternatively, the diffuser layer 16 and the second micro-optical layer 52 could be spaced apart from one another by an optically transparent adhesive layer of finite extension (not shown in detail). The first micro-optical layer 20 is connected to the second micro-optical layer 52 via a second optically transparent adhesive layer 26. Here, too, the adhesive layers for 24, 26 could merge into one another (not shown in detail). In FIG. 8, the adhesive layers 24, 26 are not shown.

Light emitted multidirectionally by one of the light-emitting diodes 12 (in FIGS. 5 and 8, the light-emitting diode 12 radiates out of the plane of the drawing toward the observer) first hits the corresponding diffuser element 18 of the diffuser layer 16 and is scattered on it. The light is then deflected by the second micro-optical layer 52, namely to the right in FIG. 7, out of the plane of the drawing in FIG. 6 and to the right in FIG. 8. The light deflected in this way hits the first micro-optical layer 20 and is deflected therein in a further direction, namely downward in FIG. 6, out of the plane of the drawing in FIG. 7 and downward in FIG. 8.

FIG. 9 shows a luminous arrangement 40 in which a luminous film 10, as shown for example in FIG. 5 to 8, is held on a curved facade 44 of a building 46. An emission range 48 of the luminous film 10 may cover a further building 50 opposite, so that an area 62 on its facade is illuminated. In order to direct the emission range 48 as desired with a curved arrangement of the luminous film 10, the optical properties, in particular, of the second micro-optical layer 52, differ depending on the position on the luminous film 10. Optical properties of the first micro-optical layer 20 can also differ depending on the position on the luminous film 10, in particular, if the luminous film is curved in a second direction, for example on a spherical facade. The first micro-optical layer allows the light from the luminous film 10 to be deflected downward (into the drawing plane).

Due to the curved arrangement of the luminous film 10, different emission angles are set up for the individual light-emitting diodes 12; this is indicated in FIG. 9 by beam paths for laterally arranged external light-emitting diodes of the luminous film 10. The main emission directions 30 of the light-emitting diodes 12 each deviate from the corresponding surface normal 32. Depending on the position, the light from different numbers of light-emitting diodes 12 is superimposed on the illuminated surface 62. In order to obtain a uniform illuminance across the surface 62, the light-emitting diodes 12 of the luminous film 10 are therefore operated with different luminosity depending on their position. This is indicated in FIG. 9 by the variable thickness of the luminous film 10. It is understood that the real luminous film 10 generally has a uniform thickness.

FIG. 10 shows a luminous arrangement 40 with two luminous films 10, for example as shown in FIG. 5 to 8 or in FIG. 1 or FIG. 2, which are attached to a motor vehicle 64. A holding structure 42 is formed on a body 66 of the motor vehicle 64 for each of the luminous films 10. The luminous films 10 are each curved in at least one direction. In the embodiment shown, the luminous film 10 at the rear of the motor vehicle 64 has a concave curvature (in the lower region) and a convex curvature (in the upper region) in the side view.

The luminous films 10 can be covered by cover elements (not shown in detail).

The cover elements can be transparent overall or at least in the region of the light-emitting diodes. Alternatively, the cover elements can have recesses for the passage of the light emitted by the light-emitting diodes and deflected by the micro-optical layers 20 or 52.

A control device 68 serves to independently activate the individual light-emitting diodes 12 of the luminous films 10. It can be provided that the control device 68 is set up for communication with a vehicle controller 70 or is integrated into the vehicle controller 70. The vehicle controller 70 can be designed to carry out driving maneuvers partially automatically or automatically.

The main emission directions 30 of the light-emitting diodes 10 are directed downward. Depending on the position of the light-emitting diode 10 on the corresponding luminous film 10, the main emission directions 30 deviate to varying degrees from a corresponding associated surface normal 32.

In summary, the invention relates to a luminous film 10 with a plurality of light-emitting diodes 12. The luminous film 10 has micro-optical elements 34, 56 which are arranged in at least one layer 20, 52. For each light-emitting diode 12, a separate micro-optical region 22, 54 with corresponding micro-optical elements 34, 56 can be provided.

The micro-optical elements 34, 56 can have different optical properties depending on their position within the corresponding region 22, 54. The micro-optical regions 22, 54 can be structurally identical, but can differ in their optical properties depending on their location on the luminous film 10. Light emitted by the light-emitting diodes 12 is deflected by the micro-optical elements 34, 56, so that for each light-emitting diode 12 a main emission direction 30 deviates from a surface normal 32 of the luminous film 10 in the region of the corresponding light-emitting diode 12. The targeted deflection of the emitted light allows the luminous film 10 to be operated with low energy consumption.

LIST OF REFERENCE SIGNS

Luminous film 10
Light-emitting diodes 12
Carrier layer 14
Diffuser layer 16
Diffuser elements 18
First micro-optical layer 20
First micro-optical regions 22
First adhesive layer 24
Second adhesive layer 26
Light input side 28
Main emission direction 30
Surface normal 32
First micro-optical elements 34
Reflection layer 36
Angle 38
Luminous arrangement 40
Holding structure 42
Facade 44
Building 46
Area 48 of light emission (emission range)
Further building 50
Second micro-optical layer 52
Second micro-optical regions 54
Second micro-optical elements 56
Reflection layer 58
Light input side 60
Illuminated area 62
Motor vehicle 64
Body 66
Control device 68
Vehicle controller 70

What is claimed is:

1. A luminous film, comprising:
    a plurality of light-emitting diodes arranged on a carrier layer; and
    at least one first micro-optical layer for deflecting the light emitted by the light- emitting diodes;
    wherein the first micro-optical layer has a first micro-optical region with first micro-optical elements for each light-emitting diode;
    wherein the first micro-optical elements each have a prism with a triangular cross-sectional area defining three prism surfaces, one being a lateral prism surface;
    wherein a reflection layer is deposited on the lateral prism surface of the three prism surfaces;
    wherein a main emission direction of the luminous film for each of the light-emitting diodes deviates from a surface normal of the luminous film in the region of the corresponding light-emitting diode.

2. The luminous film according to claim 1, wherein, for the light-emitting diodes, a range of light emission is in each case at most 120°.

3. The luminous film according to claim 1, wherein the first micro-optical layer is formed with an embossed plastics film.

4. The luminous film according to claim 1, wherein the first micro-optical elements run parallel to one another in the corresponding first micro-optical regions.

5. The luminous film according to claim 1, wherein the luminous film has a second micro-optical layer for deflecting the light emitted by the light-emitting diodes, wherein the second micro-optical layer causes a deflection in a different direction than the first micro-optical layer.

6. The luminous film according to claim 5, wherein the second micro-optical layer has a second micro-optical region with second micro-optical elements for each light-emitting diode, wherein at least one optical property of the second micro-optical elements changes over the corresponding second micro-optical region.

7. The luminous film according to claim 6, wherein the second micro-optical elements each have a reflection layer, wherein the second micro-optical elements each have a prism, with a triangular cross-sectional area, wherein the reflection layers are formed on a lateral surface of the corresponding prism.

8. The luminous film according to claim 1, wherein the luminous film has a diffuser layer.

9. The luminous film according to claim 8, wherein a separate diffuser element is provided for each light-emitting diode.

10. The luminous film according to claim 1, wherein the layers of the luminous film are connected to one another by an optically transparent adhesive.

11. The luminous film according to claim 1, wherein the luminous film has a control device for activating the individual light-emitting diodes independently of one another.

12. A luminous arrangement with a holding structure and the luminous film according to claim 1, which is held on the holding structure.

13. The luminous arrangement according to claim 12, wherein the holding structure is part of a building.

14. The luminous arrangement according to claim 12, wherein the holding structure is part of a motor vehicle, being a body of the motor vehicle.

15. The luminous arrangement according to claim 12, wherein the main emission direction of the luminous film for each of the light-emitting diodes is directed downwards, wherein a region of the light emission extends up to at most 10° above the horizontal.

16. The luminous arrangement according to claim 12, wherein the luminous film is held on the holding structure curved in at least one direction or curved in two directions.

17. An operating method for the luminous arrangement according to claim 12, wherein the light-emitting diodes in different portions of the luminous film are operated with different luminosity, wherein a uniform illuminance is achieved within an illuminated area.

18. The luminous film according to claim 1, wherein at least one optical property of the first micro-optical elements changes over the corresponding first micro-optical region.

19. The luminous film according to claim 11, wherein the reflection layers of the corresponding first micro-optical region form different angles with a light input side of the first micro-optical layer.

20. A luminous film, comprising:
- a plurality of light-emitting diodes arranged on a carrier layer; and at least one first micro-optical layer for deflecting the light emitted by the light-emitting diodes;
- wherein the luminous film has a second micro-optical layer for deflecting the light emitted by the light-emitting diodes, wherein the second micro-optical layer causes a deflection in a different direction than the first micro-optical layer;
- wherein the second micro-optical layer is arranged between the light-emitting diodes and the first micro-optical layer;
- wherein a main emission direction of the luminous film for each of the light-emitting diodes deviates from a surface normal of the luminous film in the region of the corresponding light-emitting diode.

* * * * *